United States Patent [19]
Miller et al.

[11] Patent Number: 5,155,623
[45] Date of Patent: Oct. 13, 1992

[54] ARRANGEMENT FOR IMAGING MULTIPLE ARRAYS OF LIGHT BEAMS

[75] Inventors: David A. B. Miller, Fairhaven; Michael E. Prise, Atlantic Highlands, both of N.J.

[73] Assignee: AT&T Bell Laboratories, Murray Hill, N.J.

[21] Appl. No.: 601,603

[22] Filed: Oct. 19, 1990

Related U.S. Application Data

[63] Continuation of Ser. No. 248,468, Sep. 23, 1988, abandoned.

[51] Int. Cl.$^5$ .............. G02B 27/10; G02B 5/30
[52] U.S. Cl. .................. 359/495; 359/497; 359/629; 359/636
[58] Field of Search ............ 350/172, 601, 171, 400, 350/401, 394, 397; 359/487, 495, 627, 629, 634, 636, 494, 497, 839, 850

[56] References Cited

U.S. PATENT DOCUMENTS

| | | | |
|---|---|---|---|
| 286,329 | 7/1927 | Sutcliffe | 350/172 |
| 1,482,070 | 1/1924 | Douglass | 350/172 |
| 3,668,406 | 6/1972 | Reid et al. | 350/172 |
| 4,793,696 | 12/1988 | Suh | 350/401 |

FOREIGN PATENT DOCUMENTS

| | | | |
|---|---|---|---|
| 573257 | 3/1933 | Fed. Rep. of Germany | 350/172 |
| 2381325 | 10/1978 | France | |
| 479755 | 7/1929 | German Democratic Rep. | 350/172 |
| 715600 | 1/1942 | German Democratic Rep. | 350/172 |
| 0054403 | 3/1989 | Japan | 350/171 |
| 0216456 | 2/1942 | Switzerland | 350/601 |
| 8704265 | 7/1987 | World Int. Prop. O. | 350/401 |

OTHER PUBLICATIONS

"Real Time Incoherent Optical-Electronic Image Subtraction", Dashiell et al., Optics Communications, Jun. 1973, pp. 105-108.

"An Optical System Employing a Beam Splitting or Combining Arrangement"; Electronic Engineering, Nov. 1964, p. 769.

*Primary Examiner*—Bruce Y. Arnold
*Assistant Examiner*—R. D. Shafer
*Attorney, Agent, or Firm*—H. T. Brendzel

[57] ABSTRACT

Apparatus for combining information beams by using a space variant mirror in the context of free space optical switching and computing, where light beams comprise beamlets that are focused onto surfaces to form arrays of light spots. Beam combining is achieved by positioning the space variant mirror to coincide with the plane on which the spots are focused, and to thereby allow one beam to pass through the space variant mirror without loss and another beam to be reflected off the space variant mirror, also without loss.

12 Claims, 4 Drawing Sheets

ARRANGEMENT FOR IMAGING MULTIPLE ARRAYS OF LIGHT BEAMS

This application is a continuation of application Ser. No. 07/248468, filed on Sep. 23, 1988, now abandoned.

BACKGROUND OF THE INVENTION

Harnessing the bandwidth of optics for transmission of information and for computing is very much at the forefront of current reasearch and development efforts. This includes work in the area of "free space" optics, where the three-dimensional space (formerly referred to as "ether") is the communication medium between light emitting devices and light detecting devices. One advantageous characteristic of "free space" is that light beams can be intersected without comingling. Another advantageous characteristic is that a large number of beams can be handled in parallel, as a group, with a single optical setup. Still another advantage is that "free space" is indeed free; it does not need to be manufactured, and it costs nothing.

On the other hand, optics imposes its own constraints on the architecture of the systems that are designed. These constraints have been overcome to some extent, as exemplified by systems described, for example, in U.S. patent application Ser. No. 071,105, filed Jul. 8, 1987, and titled "Computational Origami", and U.S. patent application Ser. No. 219,623 filed Jul. 15, 1988 and titled "Optical Crossover Network". These and other free space systems have one thing in common, and that is the use of plane arrays of optical devices, and corresponding arrays of light beams. Typically also, a number of different beam arrays are required because a usable logic device will, in general, need at least two logical inputs. Depending on the type of device, it may also require one or more optical bias beams. This is akin to a transistor logic gate, where one employs a number of logic signals and a power supply source for operating the logic gate. Hence, there is a need in the field of free space optical information handling to operate with a plurality of beams and, in particular, there is a need to arrange for multiple arrays of beams, with each array being derived possibly from a different source or sources, to be incident on a desired array of optical devices. In other words, there is a need to combine beams and to separate beams.

On approach for combining or separating two beam arrays is to apply them to a beam splitter as shown, for example, in FIG. 1. Beam 11 is applied to cube beam splitter 10 at one face of the beam splitter, where it is split into beams 13 and 14. Beam 12 is applied to beam splitter 10 at another face of the splitter (orthogonal to the first face), wherein it is split into beams 15 and 16. Beams 14 and 15 exit beam splitter 10 at the same face (to the right) and thus they are combined. Alas, using simple beam splitters to achieve beam combining entails loss, since energy is diverted to beams 13 and 16.

Polarization-dependent beamsplitters can also be used to combine two beams, and such combining is achieved essentially but without loss. In the arrangement of FIG. 1 where the beam splitter is sensitive to the polarization mode of the incoming light, it can be arranged for the light of beam 11 to be so polarized that it passes through the beam splitter without deflection, thus placing no energy in beam 13. Similarly, it can be arranged for the light of beam 12 to be so polarized that it is deflected in the beam splitter, thus placing no energy in beam 16. The resultant beam combining that occurs within beam splitter 10 is lossless, but the combined beam is partially polarized in one mode and partially polarized in another mode.

Dichroic beamsplitters can be used, in principle, to combine beams of different wavelengths without loss. In practice, however, we may not wish to be constrained to use different wavelengths for the different beams, and devices may not work if such different wavelengths are used.

In a different environment, and for a different purpose, image combining has been accomplished with the use of a reflective grating. This approach is described in "Real Time Incoherent Optical-Electronic Image Subtraction," Dashiell et al., *Optics Communications*, Jun., 1973, pps. 105–108. The described approach passes one image through a reflective grating and reflects another image through the same grating. The grating in effect samples both images. The combined sample images are then applied to an image plane where the sampled combined image is converted to electronic signals and processed. This is akin to sampling a signal at a high rate (above Nyquist rate), combining the sampled signals, and filtering with an appropriate bandpass filter. Of course, there is loss associated with this approach because a portion of each image is missing. In fact, in its operation (vis-a-vis loss) the Dashiell et al. arrangement is identical the arrangement of FIG. 1, but optically more complex.

SUMMARY OF THE INVENTION

This invention overcomes the drawbacks of prior art methods of combining information beams by using a space variant mirror in a new manner. More specifically, in the context of free space optical switching and computing, where light beams comprise beamlets that are focused onto surfaces to form arrays of light spots, this invention combines beams by appropriately positioning the space variant mirror to coincide with the plane on which the spots are focused. No loss occurs with this method of beam combining because the mirror is positioned with its reflected areas situated at the beam waists of the reflected array of beamlets (in each of the three dimensions) and, concurrently, the mirror is also positioned with its transmissive areas situated at the beam waists of the transmitted array of beamlets.

In one preferred embodiment the space variant 90° mirror is placed at an angle other than 90° with respect to the center axis of the beam that is transmitted through the mirror. The beam that is reflected is then appropriately arranged with respect to that center axis to combine the reflected beam with the transmitted beam to form a single beam that is applied to the image collection optics. Advantageously, the angle of the mirror with respect to that center axis is as close to 90° as practical, and the beams (both the transmissive and the reflective beams) are arranged to be very weakly divergent.

In another preferred embodiment, a beam splitter is used to permit the reflective beam to be arranged perpendicularly to the transmissive beam. In this arrangement, the beam splitter is interpossed between the reflective beam and the mirror, and the mirror is situated perpendicularly to the center axis of the transmissive beam. The beam splitter deflects the reflective beam onto the space variant mirror.

To avoid losses associated with the beam splitter, a still another embodiment employs a beam splitter that is sensitive to the polarization of light. The reflective beam is then arranged to be polarized in the mode that causes deflection in the beam splitter. To provide for a combined beam that is uniformly polarized, a quarter wave plate is placed between the beam splitter and the mirror, and the transmissive beam is arranged to have a circular polarization mode. The resulting combined beam passes through the the quarter wave plate and the beam splitter without deflection, possessing a polarization mode that is orthogonal to the polarization mode of the incoming reflective beam.

DETAILED DESCRIPTION

Figure 1:
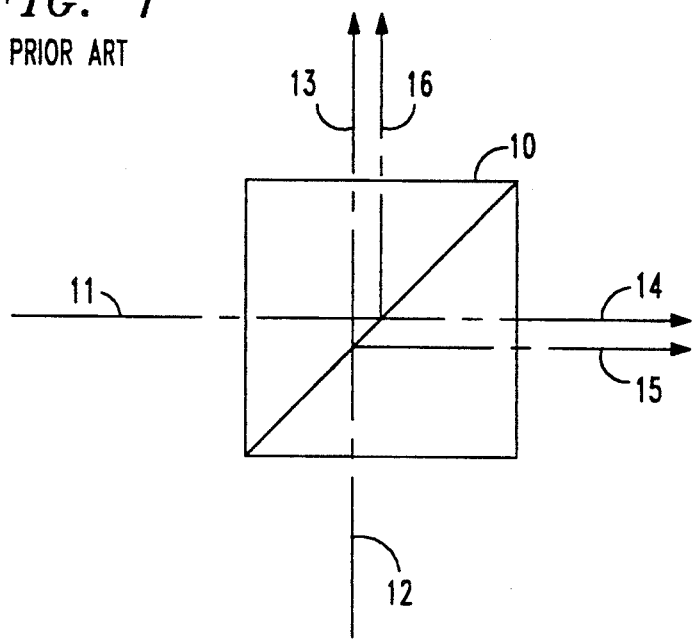
FIG. 1 shows a prior art approach to beam combining.
Figure 2:
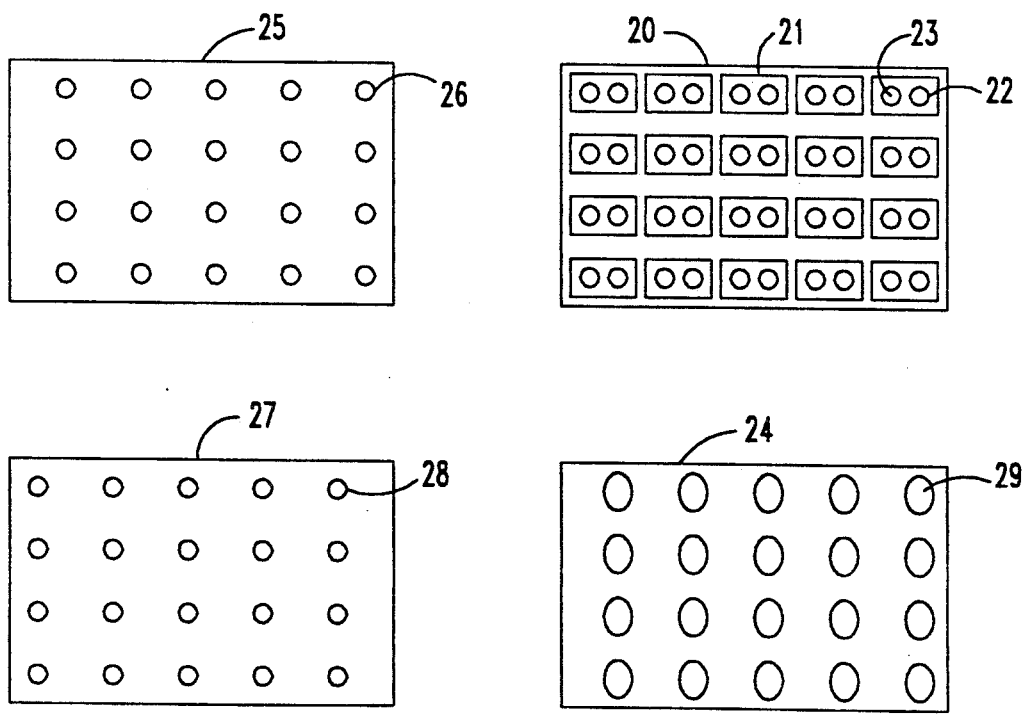
FIG. 2 shows the arrangement of light spots from two beam arrays that form the input to an optical logic array.

FIG. 2 depicts a possible arrangement where the principles of this invention can be utilized. Rectangle 20 represents a surface that contains optical logic elements 21, such as SEED devices. It is desired to apply to each logic element 21 two light spots, such as 22 and 23. Rectangle 25 represents the surface of light emitting devices 26. This can be a structure on there is place an array of LED, a source of light spots derived from a single laser beam, etc. Devices 26 correspond in number and relative position to light spots 22 of rectangle 20. It is realized, of course, that magnification and reduction are possible, but for purposes of this description and for the sake of simplicity, a magnification factor of 1 is assumed. Rectangle 27 represents another surface of light emitting devices 28, and these devices correspond to light spots 23 of rectangle 20. It may be noted that in FIG. 2 light sources 28 have a positional orientation within rectangle 27 that is slightly shifted to the left when compared to the positional orientation of elements 26 in rectangle 25. This shift corresponds to the separation between light spots 22 and 23 in rectangle 20. In an actual realization, however, it is likely that the entire array (the rectangle and its associated light sources) would be shifted.

What is necessary to accomplish is the combining of light source 26 and light sources 28 and to apply the combined energy onto rectangle 20.

Figure 3:
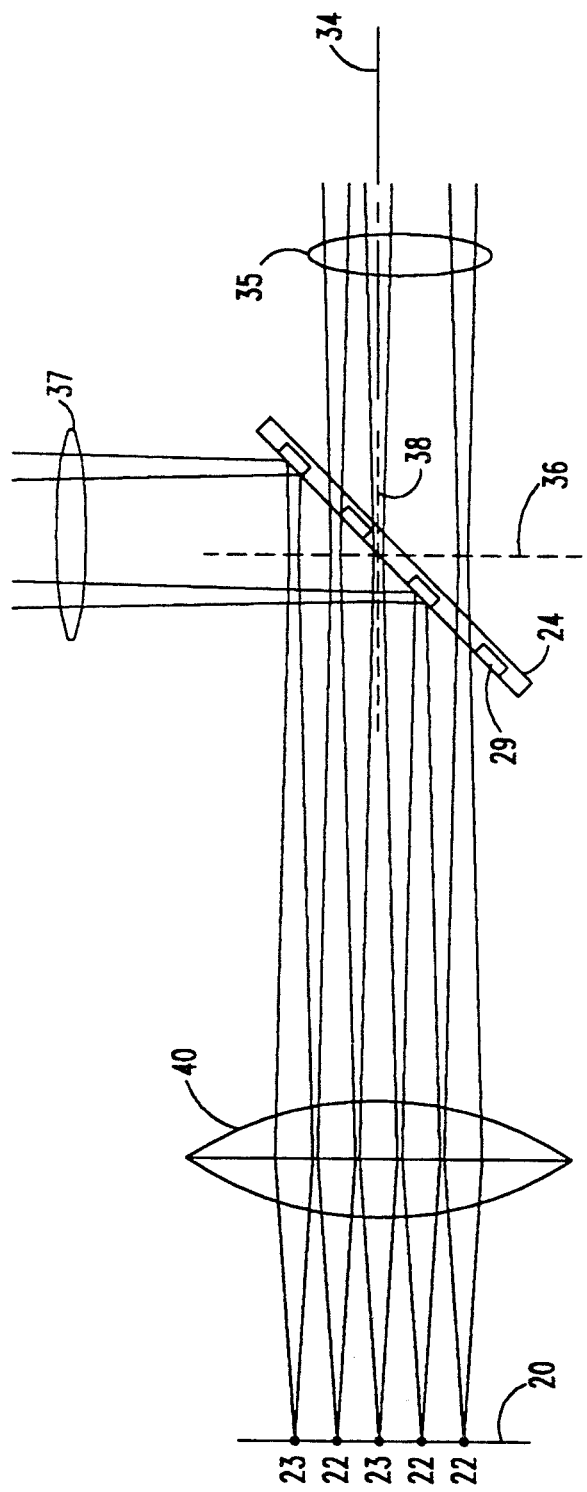
FIG. 3 depicts one realization for a beam splitter in accordance with the principles of our invention.

FIG. 3 depicts one arrangement in accordance with the principles of this invention. In FIG. 3, light sources from rectangle 25 pass through an appropriate focusing lens to result in beam 35 that focuses an array of spots onto a plane indicated by dashed line 36. Similarly, light sources from rectangle 27 pass through an appropriate focusing lens and result in beam 37 that focuses an array of spots onto a plane represented by dashed line 38. Mirror 24 is a thin glass plate on which reflective areas 29 are deposited. The front view of mirror 24 is shown in FIG. 2. It may be noted that the reflective areas of mirror 24 for the FIG. 3 arrangement are elliptical, with the major axis being $\sqrt{2}$ times the mirror axis. This accounts for the tilt of the mirror with respect to reflected beam 37. As arranged in FIG. 3, the light of beam 35 passes entirely through the transmissive portion of mirror 24 while the light of beam 37 is reflected in its entirety off reflective areas 29 of mirror 24. Also as arranged in FIG. 3, beam 37 is approximately at right angles to beam 35 and mirror 24 is approximately an angle of 45° with respect to the center axis (34) of beam 35. That is, mirror 24 is an angle that is half the angle between the center axes of beams 35 and 37. The light transmitted through mirror 24, combined with the light reflected off mirror 24, is applied to focusing lens 40. Lens 40 focuses light spots 22 and 23 onto plane 20.

From FIG. 3 it is readily apparent that beams 35 and 37 must be very weakly converging because the waist of the beamlets of beam 35 do not all coincide in space with the transmissive portions of mirror 24. The waists are at plane 36, while the mirror is at a different plane (that is at a 45° angle thereto). Correspondingly, the waists of the beamlets of beam 37 (at plane 38) also do not all coincide with the reflective areas of mirror 24. Use of beams 35 and 37 that are not very weakly converging would result in two problems. First, with respect to beam 35, some light might not be transmitted (when it expands to cover more than the transmissive portion of the mirror) and the loss of light, when it occurs, would increase with the distance away from the center axis of beam 35. With respect to beam 37, light might also be lost when the beam is wider than the reflective portion and, additionally, crosstalk can occur when the energy of one spot is comingled on the reflective portions of mirror 24 with the energy of another spot.

Figure 4:
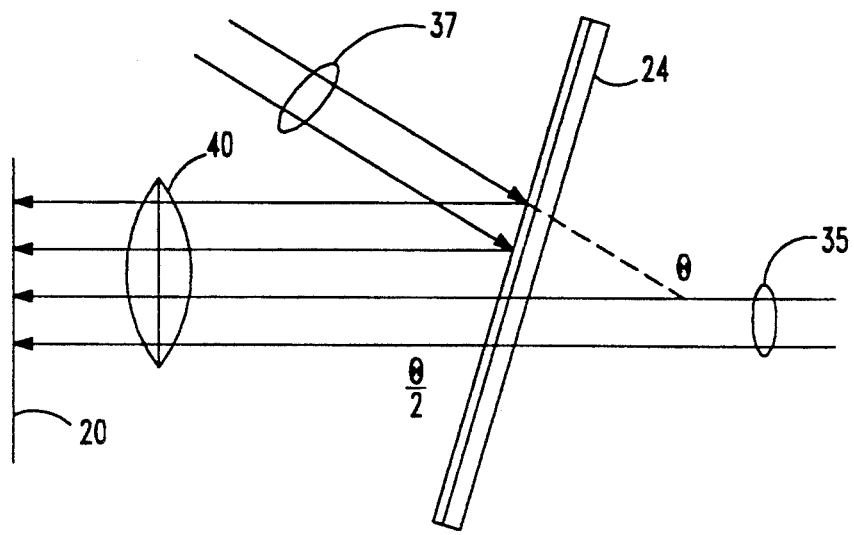
FIGS. 4 and 5 illustrate enhanced embodiments of the realization presented in FIG. 3.

FIG. 4 illustrates an optical setup that minimizes the above problem. In FIG. 4, beam 37 is situated at an angle $\theta$ with respect to the center axis of beam 35 that is as close to 180° as is possible, and mirror 24 is situated at the angle $\theta/2$.

Figure 5:
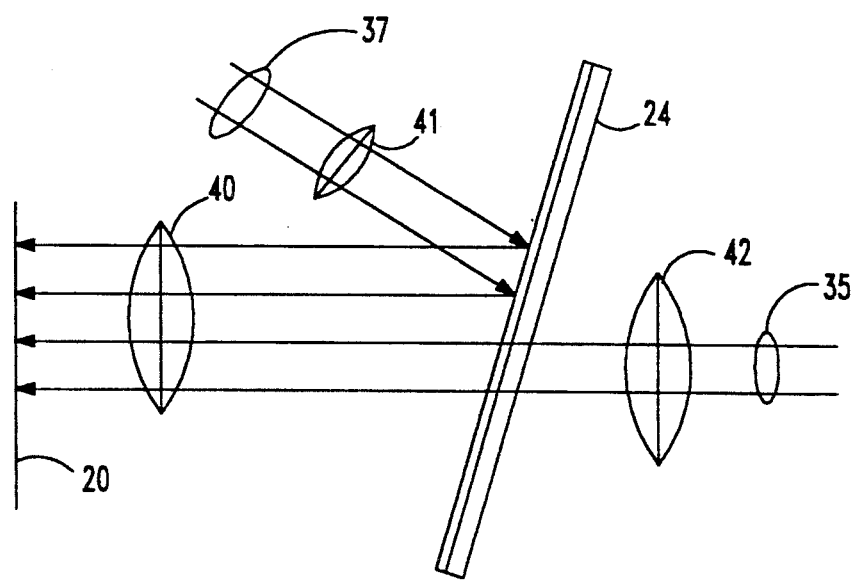

FIG. 5 depicts an arrangement that is similar to the arrangement of FIG. 4, but it includes field lenses 41 and 42. Lenses 41 and 42 image the pupil of the source onto the pupil of the objective, which permit lens 40 to have a smaller diameter.

Figure 6:
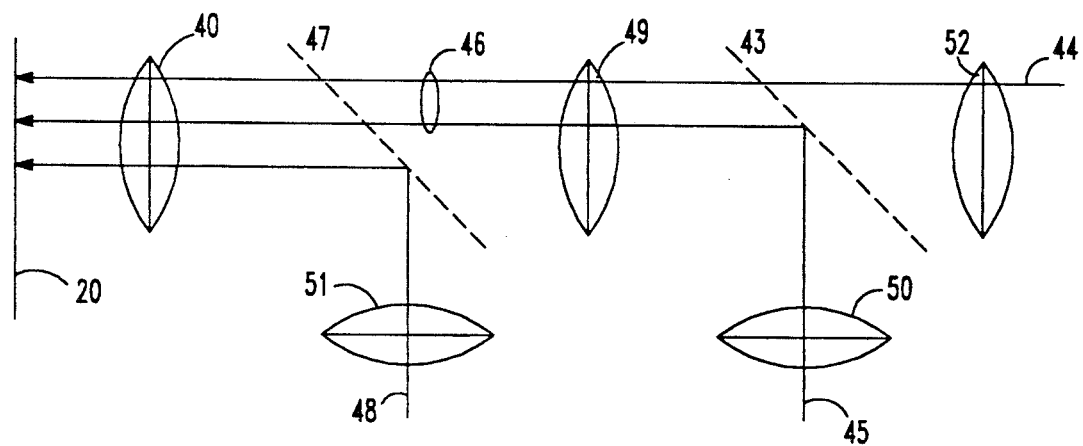
FIG. 6 shows the use of our invention to combine more than two beams.

FIG. 6 presents an optical arrangement modeled after FIG. 3 that may be employed when more than two beams are to be combined. In essence, mirror 43 combines beams 44 and 45, to form combined beam 46, and mirror 47 combines beam 46 and beam 48. A focusing relay lens 49 is placed between mirror 43 and mirror 47 and field lenses 50, 51 and 52 can also be included. The principles employed in FIG. 6 can easily be extended to a large number of beams to be combined. As an aside, it may be observed that the spatial arrangement of mirror 47 is different from that of mirror 43, with the former most likely having more transmissive areas than the latter.

Mirrors such as the ones described above, with arbitrary patterns of reflective and transmissive regions, can be fabricated by conventional lithographic techniques. In one conventional approach, for example, a metallic reflective coating is deposited on a glass substrate, and photoresist is applied to the substrate. The photoresist is then exposed in the usual manner with the appropriate pattern from a lithographic mask, etched away to expose the areas of metal to be removed, and the metal is then etched away. At this stage, an antireflection coating is conveniently evaporated onto the exposed glass substrate to remove any residual reflectivity of the glass surface (or reduce it to acceptably low levels), and finally the remaining photoresist is removed. The back surface of the whole substrate could also be antireflection coated to reduce reflection off this surface as well. Similar results can be obtained using dielectric mirror coatings in place of the metallic coating. Many other methods of making such space-variant mirrors would be obvious to those skilled in the art.

If the glass substrate is thick, allowance has to be made for the lateral displacement that the substrate would induce on the transmitted beams. This involves adjustments in the positioning of the preceding mirrors or incorporation of compensating plates.

Figure 7:
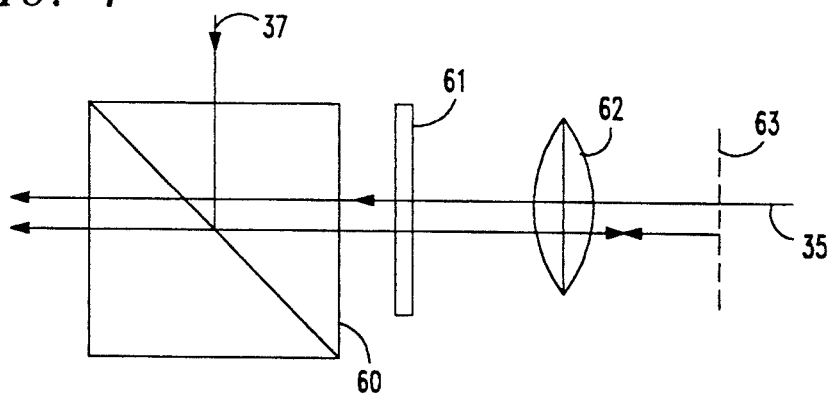
FIG. 7 presents a realization of our invention that employs a beam splitter.

FIG. 7 presents an optical setup that employs the principles of our invention and also overcomes the drawbacks of the FIG. 3 optical setup. In FIG. 7, beam 37 is applied to a beam splitter (here, cubic beam splitter 60) that is sensitive to the polarization of light. That is, it deflects light that is y-polarized and passes light that is x-polarized. Beam 37 is arranged to be y-polarized and, accordingly, it is deflected to the right in beam splitter 60. At the face of beam splitter 60 where beam 37 exits there is an arrangement comprising a quarter-wave plate 61, a focusing lens 62, and a space variant mirror 63. Beam 35 is applied, as in FIG. 3, from the right of mirror 63. The light of beam 35 focuses to an array of spots at the plane of mirror 63, and mirror 63 is positioned to align the transmissive areas of the mirrors with the waists of the focused beam 35. Beam 35 is circularly polarized. The light transmitted through mirror 63 is collimated in lens 62 and applied to plate 61. Plate 61 converts the circularly polarized light in x-polarization and applies that light to beam splitter 60. The x-polarized light passes through beam splitter 60.

Beam 37 is applied in the FIG. 7 optical setup from the top. It is collimated and possesses a y-polarization. The collimated light is deflected in beam splitter 60 and passes through plate 61 where it is converted to circular polarization. Lens 62 focuses the light of beam 37 onto the reflective areas of mirror 63. That light is reflected, collimated in lens 62, converted to x-polarization in plate 61, and passes through beam splitter 60 together with beam 35.

It may be appreciated that the order of lens 62 and plate 61 can be interchanged. Indeed, lens 62 can be positioned before the beam splitter, although such an arrangement must deal with divergent beams as they exit the beam splitter to the left (after being combined). It may also be appreciated that the FIG. 7 optical setup can be simplified when one is willing to accept loss. In such a case, one can use a beam splitter that is not polarization sensitive and one can do without the quarter wave plate. The polarization of light would be immaterial in such an optical setup.

The above descriptions illustrate and teach the principles of our invention, but it is realized that many extensions naturally flow from these teachings, both with respect to general manipulations of beams, and with respect to specific realizations. For example, it is probably clear to the skilled artisan that the beam combining principles described above apply equally well to beam splitting needs. Also, combining three beams with an optical setup akin to the setup of FIG. 7 is quite straightforward, as illustrated by FIG. 8.

Figure 8:
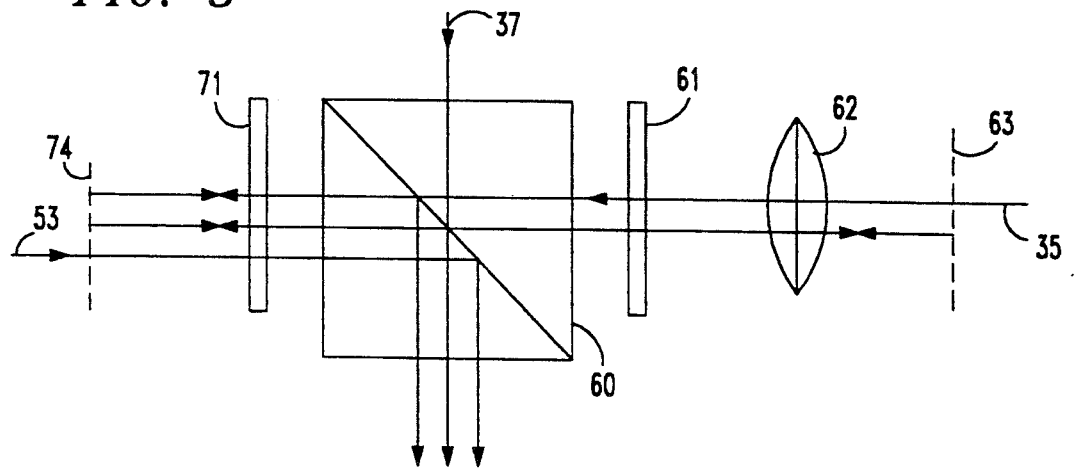
FIG. 8 illustrates a realization of our invention for combining three beams with the aid of one beam splitter.

In FIG. 8, beam 53 is circularly polarized. It passes through space variant mirror 74, lens 72, and through quarter-wave plate 71 where it is converted to y-polarization. The beam is then applied to beam splitter 60 where it is deflected to the output of the beam splitter. Beam 37, which is y-polarized, is deflected in beam splitter 60, passes through quarter-wave plate 61, is reflected off space variant mirror 63, and passes through plate 61 a second time whereupon it assumes x-polarization. Thereafter, the beam passes through beam splitter 60, passes through plate 71, is reflected off mirror 74, and passes through plate 71 a second time, whereupon is assumes y-polarization. The beam then re-enters beam splitter 60 and is deflected to the output. Beam 35, possessing circular polarization, passes through mirror 63 and plate 61 and assumes x-polarization. Thereafter it follows the path taken by beam 37.

We claim:

1. A beam combiner/splitter characterized by
   a first plurality of beams
   a second plurality of beams
   means responsive to said first plurality of beams for forming a first pattern of beam waists at a first surface and a first corresponding pattern of energy spots at a working surface;
   means for focusing said second plurality of beams to form a second pattern of beam waists at a second surface and to form a second corresponding pattern of energy spots at said working surface; and
   a mirror at said working surface having collection of reflective areas and transmissive areas, with said reflective areas arranged in accordance with said first corresponding pattern of energy spots and said transmissive areas arranged in accordance with said second corresponding pattern of energy spots, and said mirror aligned to pass essentially all of the energy of said second corresponding pattern of energy spots through said transmissive areas and to reflect essentially all of the energy of said first corresponding pattern of energy spots off said reflective areas.

2. The beam combine/splitter according to claim 1, further comprising collection optics that is situated to accept the energy of said first corresponding pattern of energy spots that is reflected off said reflective areas of said mirror and the energy of said second corresponding pattern of energy spots that is transmitted through said transmissive areas of said mirror.

3. The beam combiner/splitter according to claim 2 where said first surface is a plane perpendicular to a first axis, said second surface is a plane perpendicular to a second axis, with said first axis forming an angle $\theta$ with respect to said second axis, and said mirror being situated perpendicularly to a third axis which is at an angle that is substantially $\theta/2$ with respect to said first axis.

4. A beam combiner/splitter according to claim 1, further comprising:
   means for combining and focusing said first pattern of beam waists reflected off said mirror and said second pattern of beam waists passed through said mirror to form a third pattern of waists at a third surface.

5. The beam combiner/splitter according to claim 1 wherein said means responsive to said first energy beam for forming said first pattern of beam waists is interposed between said applied first energy beam and said mirror, and wherein said means responsive to said second energy beam for forming said second pattern of beam waists is interposed between said applied second energy beam and said mirror.

6. The beam combiner/splitter according to claim 1 wherein said means responsive to said first plurality of beams comprises a lens interposed between said first plurality of beams and said mirror, and wherein said means for focusing said second plurality of beams comprises a lens interposed between said second plurality of beams and said mirror.

7. The beam combiner/splitter according to claim 1 wherein said first surface intersects said second surface within the space of said mirror.

8. A beam combiner/splitter characterized by means responsive to an applied first plurality of energy beams for forming a first pattern of beam waists at a first surface and a first corresponding pattern of energy spots at a working surface;
   means responsive to an applied second plurality of energy beams for forming a second pattern of beam waists at a second surface and for forming a second corresponding pattern of energy spots at said working surface; and
   a mirror at said working surface having a collection of reflective areas and transmissive areas, with said reflective areas arranged to coincide with said first corresponding pattern and said transmissive areas arranged to coincide with said second corresponding pattern, said mirror thus passing essentially all of the energy of said second corresponding pattern of energy spots through said transmissive areas and reflecting essentially all of said first corresponding pattern of energy spots off said reflective areas, and further comprising:
   means for combining and focusing said first pattern of beam waists reflected off said mirror and said second pattern of beam waists passed through said mirror to form a third pattern of waists at a third surface;
   means responsive to an applied third energy beam for forming a fourth pattern of waists at a fourth surface; and
   a second mirror having a collection of reflective areas and transmissive areas, with said reflective areas arranged to coincide with said third pattern and said transmissive areas arranged to coincide with said fourth pattern, and said mirror thus reflecting said fourth pattern of beam waists off said reflective areas and passing said third pattern of beam waists through said transmissive areas.

9. An apparatus comprising:
   a beam splitter for receiving energy from a first direction, delivering at least a portion of said energy to second direction, and for receiving energy from said second direction;
   a mirror, positioned perpendicularly to said second direction, that includes a collection of reflective areas and transmissive areas wherein said beam splitter directs light that is received from said first direction to said second direction, when the light from the first direction is polarized in a first mode and directs light that is received from said second direction to a third direction, when the light from the second direction is polarized orthogonally to said first mode; and further comprising quarter-wave plate between said beam splitter and said mirror.

10. An apparatus comprising:
    a beam splitter for receiving a first plurality of energy beams from a first direction, delivering at least a portion of said energy to a second direction, and for receivng energy from said second direction;
    a mirror that includes a collection of reflective areas and transmissive areas, that is positioned perpendicularly to said second direction and adapted to reflect energy delivered by said beam splitter to said second direction;
    means for focusing essentially all of the energy delivered by said beam splitter to said second direction onto said reflective areas of said mirror to cause the energy so focused to reflect off said mirror and reenter said beam splitter; and
    means for focusing essentially all of the energy of a second plurality of energy beams received from said second direction onto said transmissive areas of said mirror to cause the energy so focused to pass through said mirror and enter said beam splitter.

11. The apparatus of claim 10 wherein said means for focusing comprises a lens interposed between said beam splitter and said mirror.

12. An optical apparatus comprising:
    first means responsive to a first plurality of beams for developing a first array of energy spots at a working surface;
    second means responsive to a second plurality of beams for developing a second array of energy spots at said working surface, with the energy spots of said second array being incongruent with the energy spots of said first array; and
    a mirror at said working surface having a collection of reflective areas and transmissive areas, with said reflective areas arranged to encompass the energy spots of said first array, and said reflective areas arranged to encompass the energy spots of said second array.

* * * * *